(12) United States Patent
Barnabo et al.

(10) Patent No.: US 6,978,687 B2
(45) Date of Patent: Dec. 27, 2005

(54) SEAT BELT TENSION SENSOR

(75) Inventors: Susan M. Barnabo, Walpole, MA (US); Ronald Frank, Stoughton, MA (US); Thomas Babington, North Dartmouth, MA (US)

(73) Assignee: Stoneridge Control Devices, Inc., Canton, MA (US)

(*) Notice: Subject to any disclaimer, the term of this patent is extended or adjusted under 35 U.S.C. 154(b) by 19 days.

(21) Appl. No.: 10/761,134

(22) Filed: Jan. 20, 2004

(65) Prior Publication Data

US 2004/0231436 A1 Nov. 25, 2004

Related U.S. Application Data

(60) Provisional application No. 60/519,963, filed on Nov. 14, 2003, provisional application No. 60/441,082, filed on Jan. 17, 2003.

(51) Int. Cl.$^7$ ................................................ G01L 1/26
(52) U.S. Cl. ............................................ 73/862.393
(58) Field of Search .................. 73/862.391, 861.451, 73/862.471, 862.392, 862.393

(56) References Cited

U.S. PATENT DOCUMENTS

| | | | |
|---|---|---|---|
| 3,784,972 A | 1/1974 | Hults | 340/52 |
| 4,065,198 A | 12/1977 | Jordan | 339/17 |
| 4,457,570 A | 7/1984 | Bogese | 339/17 |
| 4,618,917 A | 10/1986 | Lee et al. | 362/88 |
| 5,060,977 A | 10/1991 | Saito | 280/802 |
| 5,636,864 A | 6/1997 | Hori | 280/735 |
| 5,996,421 A | 12/1999 | Husby | 73/862.451 |
| 6,081,759 A | 6/2000 | Husby et al. | 701/45 |
| 6,205,868 B1 | 3/2001 | Miller | 73/862.391 |
| 6,230,088 B1 | 5/2001 | Husby | 701/45 |
| 6,336,371 B1 | 1/2002 | O'Boyle | 73/865.9 |
| 6,400,145 B1 | 6/2002 | Chamings et al. | 324/207.26 |
| 6,502,860 B1 | 1/2003 | Siegfried | 280/801.1 |
| 6,508,114 B2 | 1/2003 | Lawson | 73/159 |
| 6,520,540 B1 | 2/2003 | Siegfried | 280/801.1 |
| 6,554,318 B2 | 4/2003 | Kohut et al. | 280/801.1 |
| 6,729,194 B2 | 5/2004 | Kaijala et al. | 73/862.69 |
| 6,732,592 B1 * | 5/2004 | Blackburn et al. | 73/826 |
| 6,749,038 B2 | 6/2004 | Sullivan et al. | 180/268 |
| 6,776,056 B2 | 8/2004 | Garver et al. | 73/862 |
| 6,857,326 B2 * | 2/2005 | Specht et al. | 73/862.393 |
| 2003/0150283 A1 | 8/2003 | Stanley et al. | 73/862.391 |
| 2003/0155166 A1 | 8/2003 | Sullivan et al. | 180/268 |
| 2004/0016304 A1 | 1/2004 | Kaijala et al. | 73/862.69 |

FOREIGN PATENT DOCUMENTS

| | | | | |
|---|---|---|---|---|
| DE | 3233153 | | 3/1984 | H01R 9/26 |
| EP | 1462318 A1 | | 9/2004 | B60R 21/01 |
| WO | WO 93/18380 | | 9/1993 | G01L 1/14 |
| WO | WO 01/79039 A1 | | 10/2001 | B60R 21/01 |
| WO | WO 02/040317 A3 | | 5/2002 | B60R 21/26 |
| WO | WO 02-44679 A1 | | 6/2002 | G01L 5/04 |

OTHER PUBLICATIONS

Joseph P. Heremans, "Magnetic Field Sensors for Magnetic Position Sensing in Automotive Applications", Apr. 1, 1997.

* cited by examiner

*Primary Examiner*—Max Noori
(74) *Attorney, Agent, or Firm*—Grossman, Tucker, Perreault & Pfleger, PLLC

(57) ABSTRACT

A seat belt tension sensor for sensing tension in a seat belt. The sensor includes a main plate and a travel member moveable relative to the main plate against a spring force. A sensor provides an output in response to the relative movement indicative of the tension applied to the seat belt. The spring force may be provided by one or more leaf springs.

13 Claims, 12 Drawing Sheets

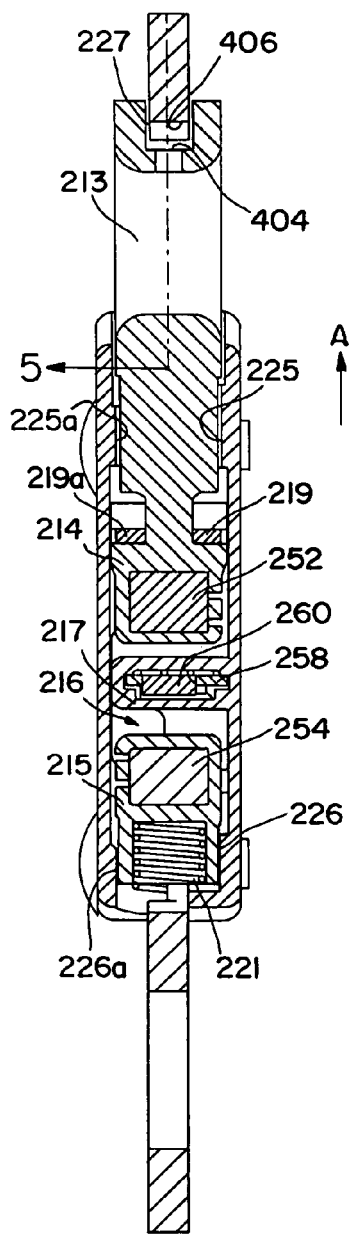
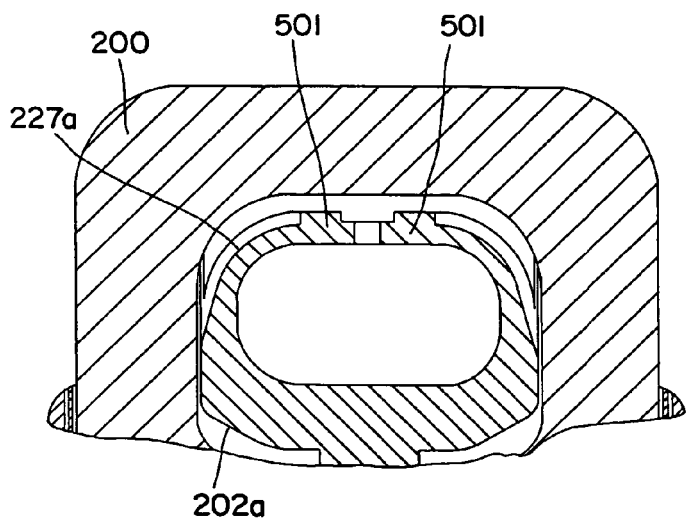
FIG. 5
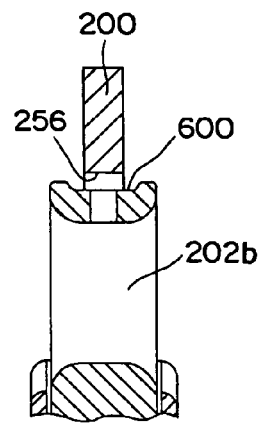
FIG. 6
FIG. 4

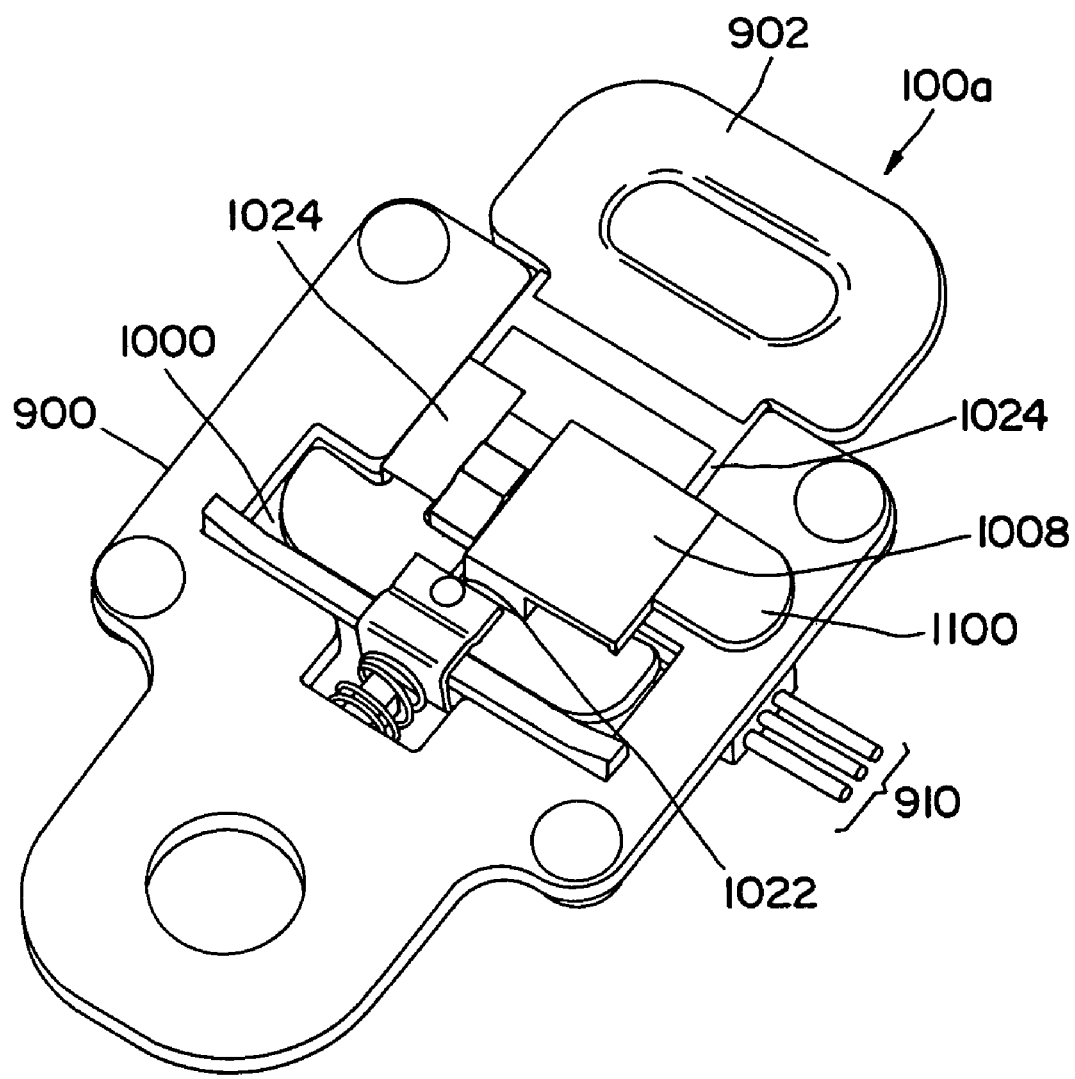
FIG. II

US 6,978,687 B2

SEAT BELT TENSION SENSOR

CROSS-REFERENCE TO RELATED APPLICATIONS

This application claims the benefit of U.S. Provisional Application Ser. No. 60/441,082, filed Jan. 17, 2003, and of U.S. Provisional Application Ser. No. 60/519,963, filed Nov. 14, 2003, the teachings of which applications are incorporated herein by reference.

FIELD OF THE INVENTION

The present invention relates in general to tension sensors, and, more particularly, to a sensor for sensing the level of tension on a seat belt in a vehicle.

BACKGROUND OF THE INVENTION

Seat belt tension sensors may be used in vehicle systems for setting an air bag system at a proper deployment force associated with a particular seat occupant. Seat belt tension sensors generally provide an output representative of the tension imparted to a seat belt disposed around the occupant. This output may be provided to a processor along with outputs from other sensors, e.g. a weight sensor and/or seat position sensor. The processor may be configured for setting an air bag system to an appropriate deployment force in response to the outputs. For example, if the seat occupant is a child, the sensor outputs may cause the processor to set the deployment force at a level appropriate for avoiding injury to the child, or even disable the system. On the other hand, if the occupant is an adult, the processor may set the system for deployment at a force sufficient to protect the occupant in the event of an accident.

Of course seat belt tension sensors must provide an output that reliably and accurately indicates the tension imparted to the seat belt. In automotive applications size, ease of installation and cost are also considerations. There is a need for a seat belt tension sensor that is small in size, and provides accurate and reliable tension sensing while allowing cost-effective manufacture and installation.

BRIEF DESCRIPTION OF THE DRAWING

For a better understanding of the present invention, together with other objects, features and advantages, reference should be made to the following detailed description which should be read in conjunction with the following figures wherein like numerals represent like parts:

FIG. 4: is a sectional view of the sensor illustrated in FIG. 3, taken along lines 4—4 of FIG. 3;

FIG. 5: is a sectional view of a top portion of another exemplary embodiment of a sensor assembly consistent with the invention;

FIG. 6: is a sectional view of a top portion of another exemplary embodiment of a sensor assembly consistent with the invention.

FIG. 11: is a front perspective view of the sensor illustrated in FIG. 9 with front and back covers removed;

DETAILED DESCRIPTION

For ease of explanation, sensor systems consistent with the invention will be described herein in connection with automobile seat belt systems. It will be recognized, however, a seat belt tension sensor consistent with the invention will be useful in connection with a wide variety of vehicle types. In addition, exemplary embodiments described herein include use of Hall Effect sensors and a magnet. Those skilled in the art will recognize, however, that a variety of sensing means may be used. For example, optical, magneto-resistive, fluxgate sensors, etc. may be useful in connection with a sensor system consistent with the invention. In alternative embodiments, sensor control elements other than magnets or shunts, e.g. an optical source, may be used. It is to be understood, therefore, that illustrated exemplary embodiments described herein are provided only by way of illustration, and are not intended to be limiting.

Figure 1:
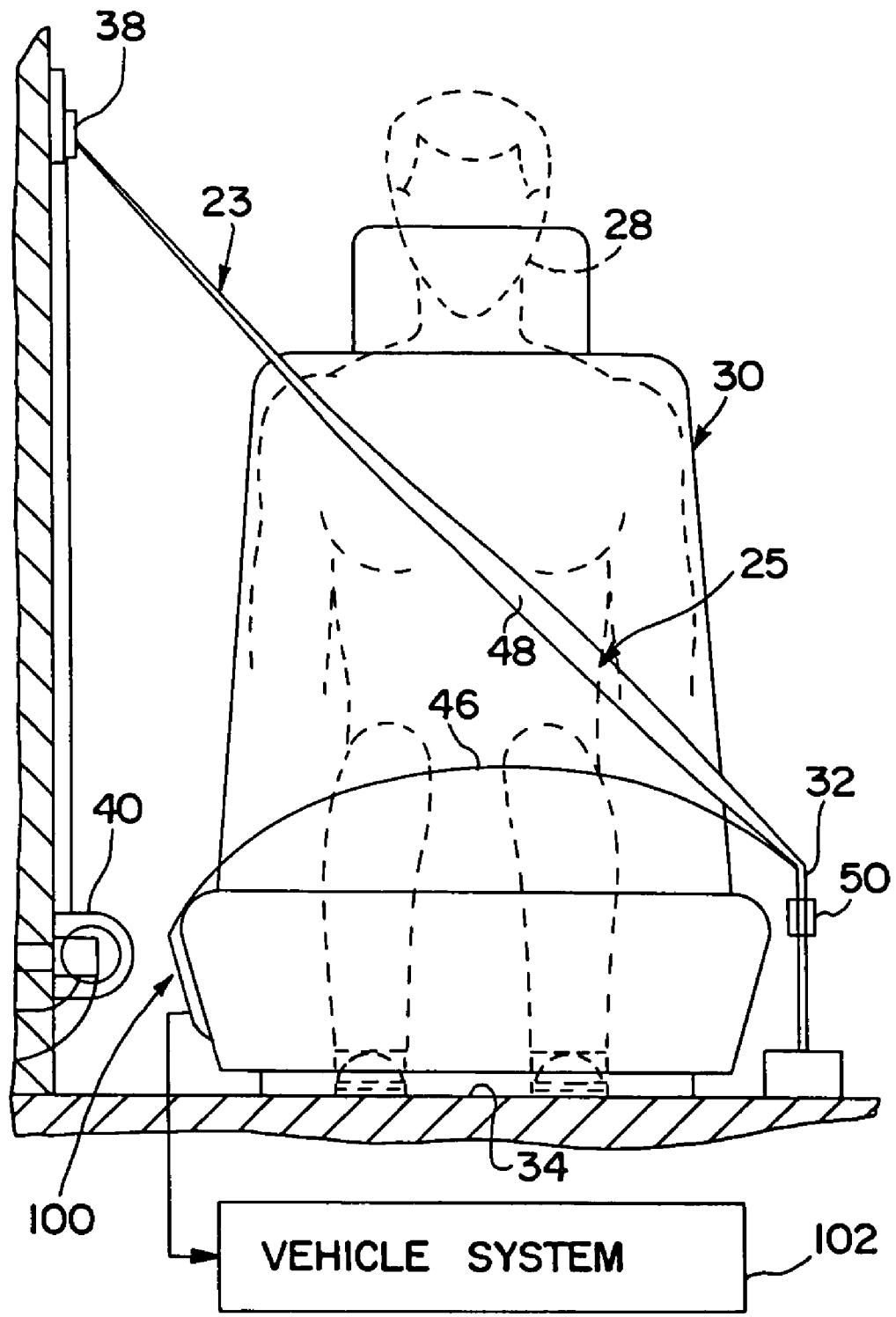
FIG. 1: diagrammatically illustrates an exemplary seat belt tension system consistent with the invention with the seat belt in a buckled condition.

Turning to FIG. 1, there is illustrated one exemplary vehicle seat belt assembly including a seat belt tension sensor consistent with the invention. In the illustrated system, the seat belt assembly 23 includes a length of seat belt webbing 26 that is extensible, in a traditional manner, about a vehicle occupant 28 of a vehicle seat 30. A buckle tongue 32 is slidably attached to the webbing 26. The seat belt webbing 26 may be anchored to a lower portion of one side of the seat 30 through a seat belt tension sensor 100 consistent with the invention. The webbing 26 may extend upwardly from the sensor 100 and pass through a D-ring or turning loop 38.

The webbing 26 may be attached to a seat belt retractor assembly 40. The seat belt retractor assembly 40 may include a spool, which is rotatable to wind a portion of the webbing 26 around the spool within the retractor assembly. The spool may be biased, such as by a spring mounted within the assembly 40, to wind a portion of the seat belt webbing 26 around the spool. In addition, the retractor assembly 40 may include a ratchet wheel and a pawl by which the rotation of the retractor spool 41 may be locked under certain circumstances.

The seat belt assembly 23 is illustrated in FIG. 1 in a belted condition. The buckle tongue 32 is adjustable along the length of the webbing 26 to divide the webbing 26 into respective lap and torso portions 46 and 48 when the webbing is belted around the vehicle occupant. A seat belt buckle 50 is located adjacent the side of the seat 30 opposite the retractor assembly 40. The buckle 50 releasably receives the buckle tongue 32, and is anchored to the vehicle.

Advantageously, the sensor 100 provides an output to a vehicle system 102, such as an airbag deployment control system, indicating the level of tension on the seat belt. The level of tension may be evaluated in the system to assist in determining the nature of the occupant 28 disposed within the seat 30. For example, the tension sensed by the sensor 100 may be provided to the system 102, e.g. along with other sensor outputs (e.g. weight sensors, seat position sensors, etc.) to set an air bag for deployment at a particular deployment force deemed safe for the occupant.

Figure 2:
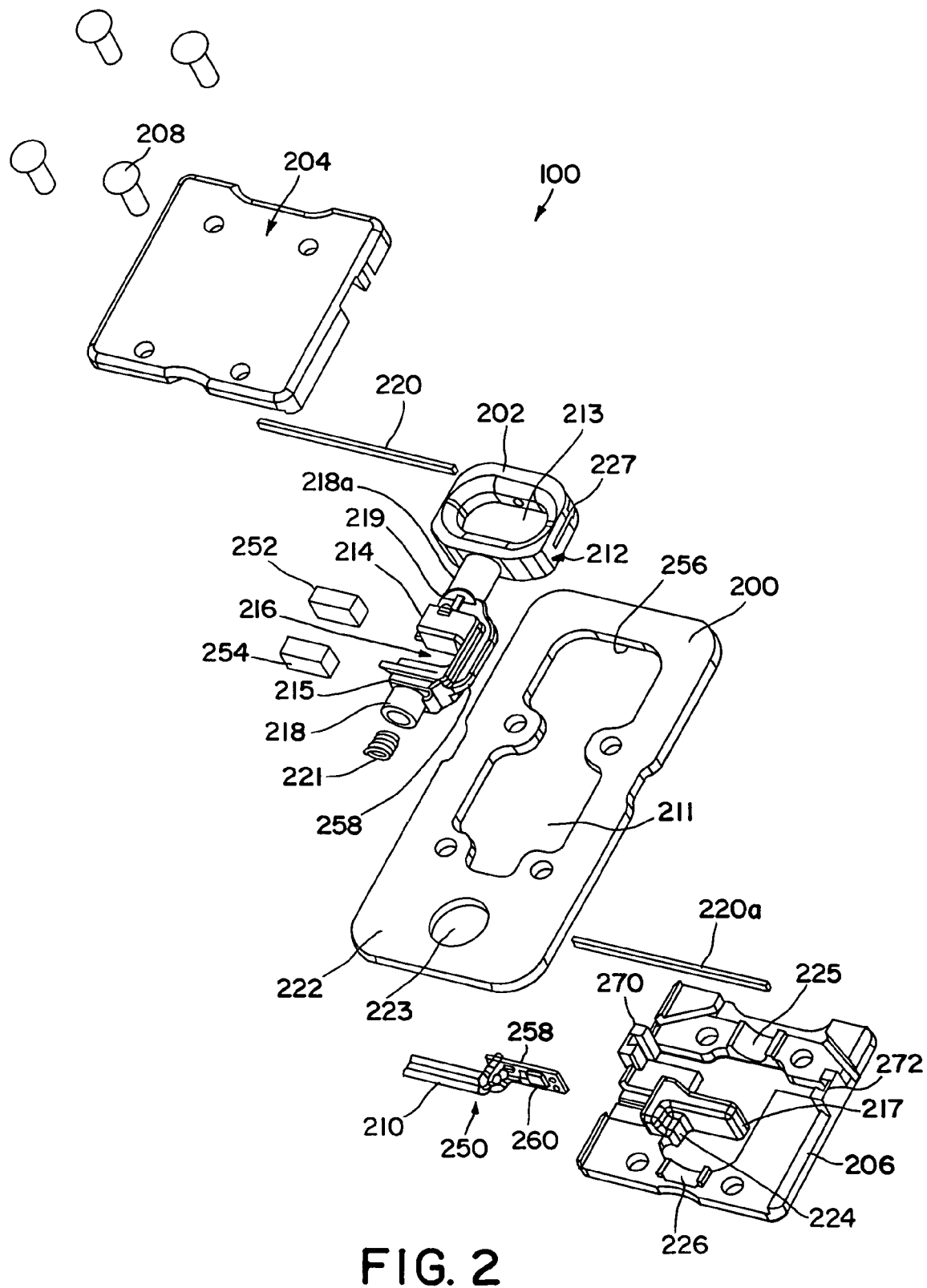
FIG. 2: is an exploded view of one exemplary seat belt tension sensor consistent with the invention.

One exemplary embodiment 100 of a seat belt tension sensor consistent with the invention is illustrated in FIGS. 2–8. With reference to FIG. 2, the illustrated embodiment includes a main plate 200, a travel member 202, a front cover 204, a rear cover 206, a sensor assembly 250, and magnets 252, 254. The sensor assembly 250 may include a printed circuit board (PCB) 258 carrying a Hall device 260, and associated electronics for supplying power to the Hall device 260 from the input power to the PCB. Input power to the PCB and the Hall device output to the vehicle system may be provided on wire leads 210. The covers may be affixed to the main plate 200 by one or more fasteners, e.g. rivets 208, and may be constructed from a material to provide magnetic shielding, as well as splash and dust protection to the internal sensor components. Magnetic shielding of the sensor components, e.g. Hall devices and magnets, may be desirable when the sensor is positioned in a vehicle adjacent a magnetic-field generating system, such as a speaker.

Figure 3:
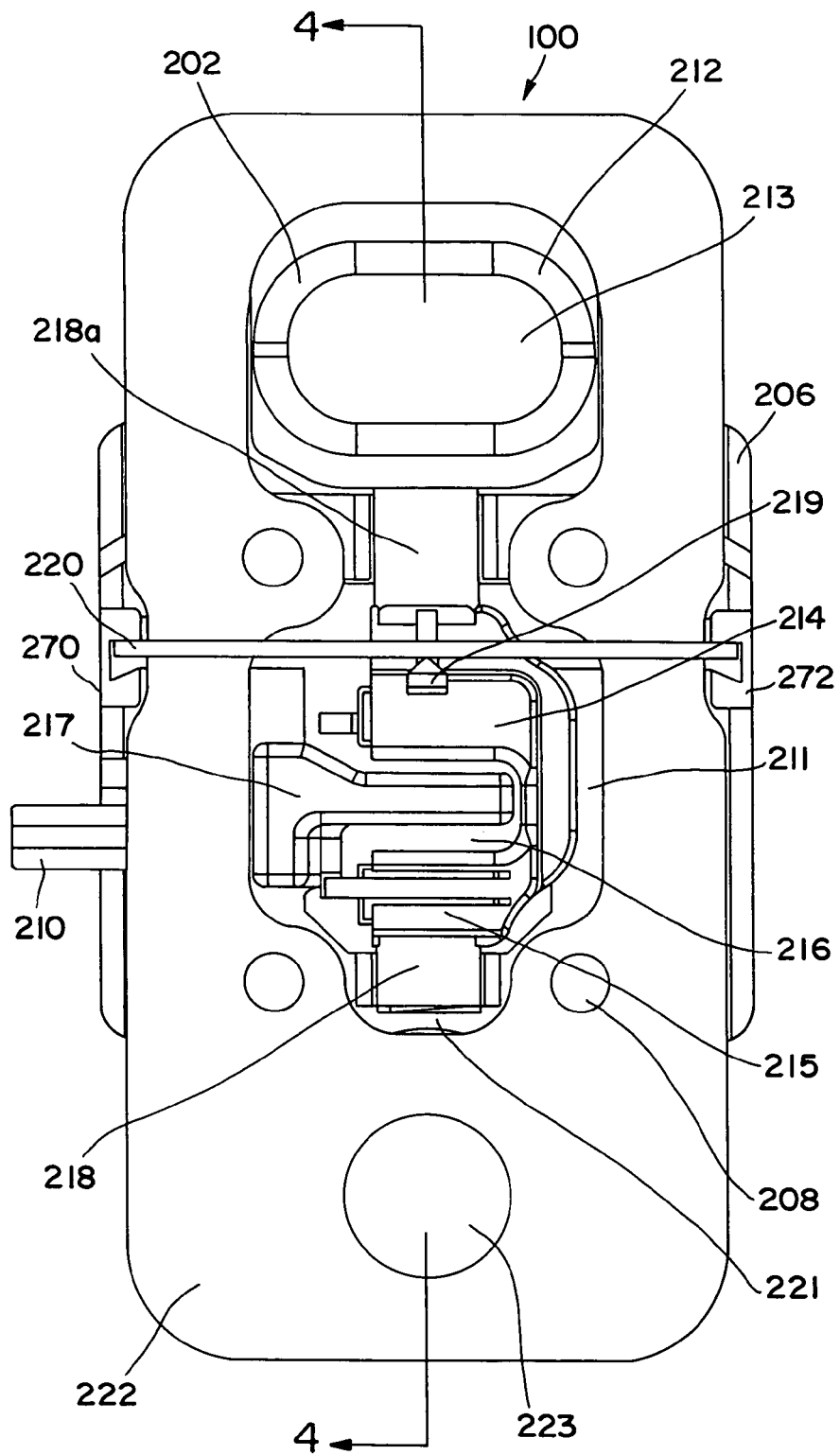
FIG. 3: is a front perspective view of the sensor illustrated in FIG. 2 with the front cover removed.

The sensor is illustrated in FIG. 3 with the front cover removed. As shown, the body of the main plate 200 includes an opening 211 for receiving the travel member 202. The travel member may be disposed in the opening 211 such that the body extends around the entire periphery of the travel member. The travel member includes an end portion 212 defining a belt loop opening 213 through which the belt webbing 26 may be looped. The end portion 212 may include channel 227 for receiving an inner edge 256 of the main plate.

The travel member 202 includes first 214 and second 215 magnet holders, for supporting magnets 252 and 254, respectively. The magnet holders are positioned in an opposed, spaced relationship with an arm 258 extending therebetween a first side of the magnet holders. The opposite sides of the magnet holders are not connected, leaving an opening 216 for receiving a section of the rear cover 206 that forms a PCB holder 217. The opening 216 may thus be generally u-shaped, i.e. having an open side.

The travel member 202 is coupled to the main plate through two spring actuators 219, 219a, first and second flat leaf springs 220, 220a supported by the rear cover, and a compression spring 221 disposed between the travel member and the main plate. Travel member bearings 218, 218a reduce friction between the travel member, the main plate, and the front and rear cover. The bearing 218 may include an opening for receiving the compression spring 221. The end 222 of the main plate opposite to the end 213 of the travel member includes an opening 223 for coupling the sensor 100 to a fixed structure in the vehicle.

In general, tension on the seat belt 26 extending through the opening 213 in the travel member 202 causes relative movement between travel member 202 and the main plate 200. The magnets 252, 254 are supported by the magnet holders 214, 215 for movement with the travel member. The PCB holder 217 is disposed in the opening 216 of the travel member, but is fixed to the rear cover, e.g. by a web of material 224 extending below the travel member and into an opening 216 in the travel member. As shown in FIG. 4, the PCB holder 217 supports the PCB 258 to position the Hall device 260 in the opening 216 between the magnets 252, 254. Thus, relative movement between the travel member and the main plate is associated with relative movement between the magnets 252, 254 and the Hall device 260.

Movement of the travel member 202 relative to the main plate 200 resulting from tension on the seat belt is achieved against the force of the flat leaf springs 220, 220a. Use of two flat springs 220, 220a, i.e. on the bottom and top of the travel member allows a low assembly profile, e.g. about 10 mm in thickness in one illustrated embodiment, as opposed to a single wider spring located in the center of the travel member. To accommodate a single wider spring, the thickness of the travel member would have to be increased.

As shown in FIG. 3, springs 220, 220a may be fixed to the bottom cover with the ends thereof being disposed in associated posts 270, 272 on opposite sides of the bottom cover. The spring actuators 219 direct force from the travel member 202 to the center of the flat springs 220, 220a. In the illustrated exemplary embodiment, the compression spring 221 provides back bias to take up any tolerance between the flat springs and the travel member actuator. This prevents lost motion and ensures a zero-load rest position, as illustrated in FIGS. 3 and 4.

When tension is applied to the travel member 202, the travel member may move, against the spring force of the flat springs 220, 220a, in the direction of arrow A in FIG. 4. In one embodiment, under a load of 30 lbs in the direction of arrow A, the travel member may move 3 mm from the rest position. A corresponding displacement occurs between the Hall device 260 in the PCB holder and the magnets 252, 2554 in the magnet holders.

Movement of the travel member 202 relative to the main plate may be limited by engagement of contact surface 404 on the channel end 227 of the travel member with associated shoulder 406 on the main plate at conditions exceeding predetermined force limits. FIG. 5 shows an alternative travel member embodiment 202a including a channel 227a with projections 501 that may yield when the belt tension reaches a certain force limit. FIG. 6 shows another alternative embodiment 202b of the travel member without channel 227. In the embodiment of FIG. 6, a top surface 600 of the travel member 202b may contact the interior edge 256 of the plate 200 when a force limit is exceeded.

The PCB holder 217 may be insert molded to encapsulate the Hall device 260, the PCB 258, and the electronics, and the magnet holders 214, 215 may be insert molded to encapsulate the magnets 252, 254. Encapsulating the magnets and PCB provides robust environmental sealing. Those skilled in the art will recognize that a variety of materials, e.g. Nylon 6/12, Nylon 6/6, or Epoxy may be used for encapsulating the magnets and PCB, etc. to form, or fill, the magnet holders and PCB holder.

To minimize hysteresis effects caused by friction between the travel member 202 and the main plate 200, the travel member bearings 218 guide the travel member in opposed front and rear cover bearing surfaces 225, 225a and 226, 226a (FIG. 4). In one embodiment, the travel member can be molded with the magnets 252, 254 in a single step, whereby the magnet holders and travel member bearings are integrally formed. Those skilled in the art will recognize that the travel member may be molded from a variety of low-friction materials. In one embodiment, for example, the travel member may be insert molded from acetal.

Grease or other lubricant may also be provided between the travel member and the interior mating surfaces of the front and rear cover, including at the travel member bearings and the bearing surfaces 225, 225a and 226, 226a of the front and rear cover. Grease or a lubricant at these locations further reduces friction between the travel member and the main plate, and can also prevent entry of dust or other contaminants between the travel member and main plate, and the main plate and the covers.

Figure 7:
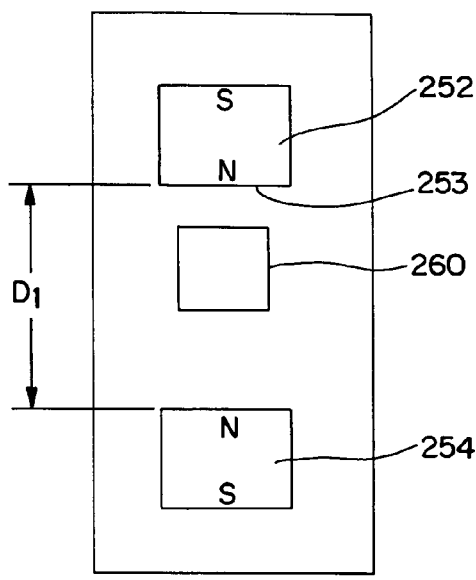
FIG. 7: diagrammatically illustrates an exemplary orientation of dual magnets and a Hall device for use in a sensor consistent with the invention.

Turning now to FIG. 7, there is illustrated in diagrammatic form an exemplary magnetic circuit useful in a sensor consistent with the invention. As shown, the magnets 252, 254 may each be positioned with a North Pole facing the Hall device 260, and the other magnet 402. In one embodiment, the magnets may be spaced by a distance D1 of 9 mm and the Hall device may be disposed about 2 mm from the magnet face 253.

Figure 8:
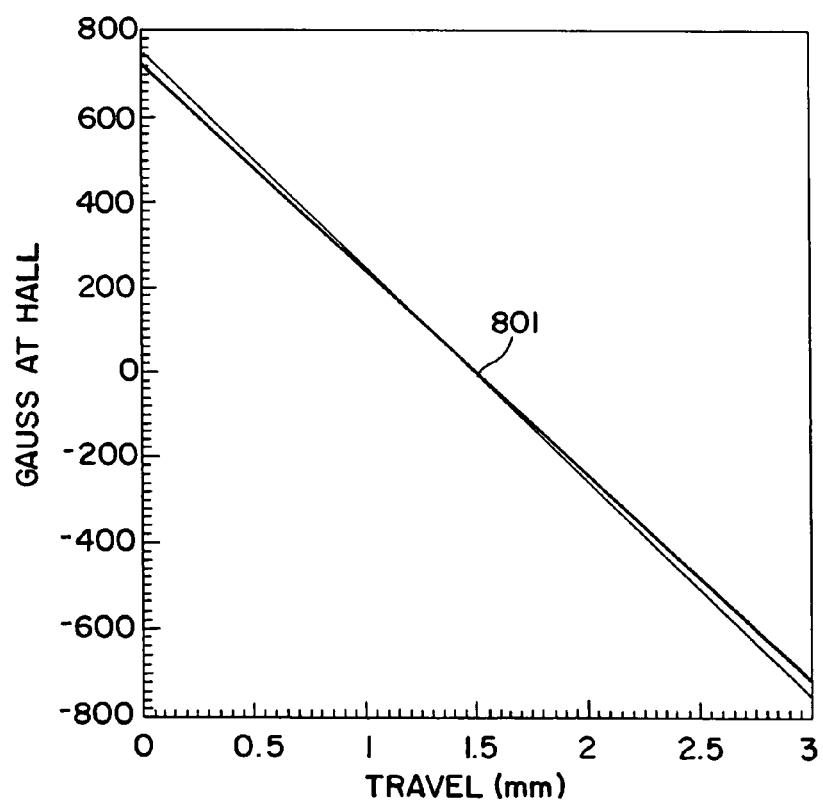
FIG. 8: is a plot of magnetic flux vs. distance associated with the configuration illustrated in FIG. 3.

FIG. 8, which is a plot 801 of magnetic flux vs. distance of travel of the magnets 252, 254 relative to a Hall device 260 for the embodiment illustrated in FIG. 2–5 and including a magnetic circuit consistent with the configuration shown in FIG. 7. As shown, a gradient of about 1500 Gauss is associated with movement of about 3 mm of the magnets relative to the Hall device. This configuration thus provides a high gradient magnetic circuit that reduces sensitivity to magnetic fields generated outside of the sensor, e.g. in a speaker. This configuration also provides small output voltage variance within large manufacturing tolerances as shown on.

Calibration of Hall device to provide an output indicative of the level of tension on the belt can be achieved prior to installation of the sensor in a seat belt system. In one embodiment, for example, calibration can be achieved by setting the Hall device 260 to provide a 1V output in an at rest position of the sensor, then setting the Hall device 260 to 4V with the travel member pulled away from the main plate at the desired maximum load requirement, e.g. 30 lbs. With this calibration, the Hall device will provide a discrete output between 1 V and 4V depending on the level of tension on the travel member 202.

Figure 9:
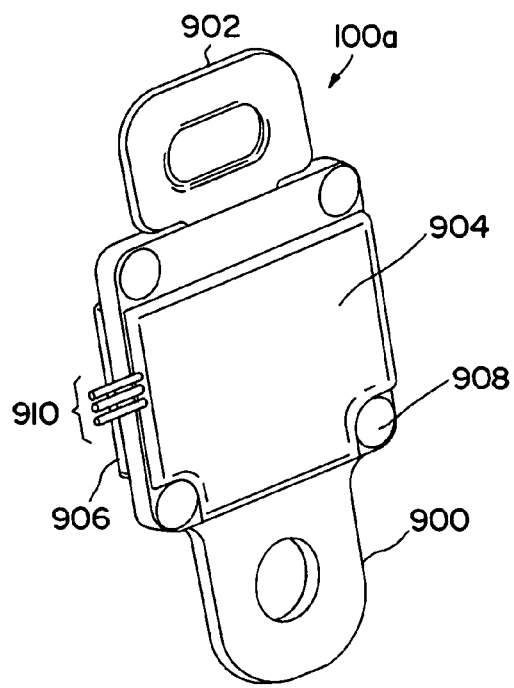
FIG. 9: is a front perspective view of another exemplary seat belt tension sensor consistent with the invention.

Turning now to FIGS. 9–13, there is illustrated another exemplary embodiment 100a of a seat belt tension sensor consistent with the present invention. With reference to FIG. 9, the illustrated embodiment generally includes a main plate, 900, a travel member 902, a front cover 904, a rear cover 906, and fasteners, e.g., rivets 908, joining the covers to the main plate 900. Wire leads 910 extend from sensor for providing the sensor output to the vehicle system 102 and providing power to the Hall device described in greater detail below. The covers may be constructed from a material to provide magnetic shielding, as well as splash and dust protection to the internal senor components.

Figure 10:
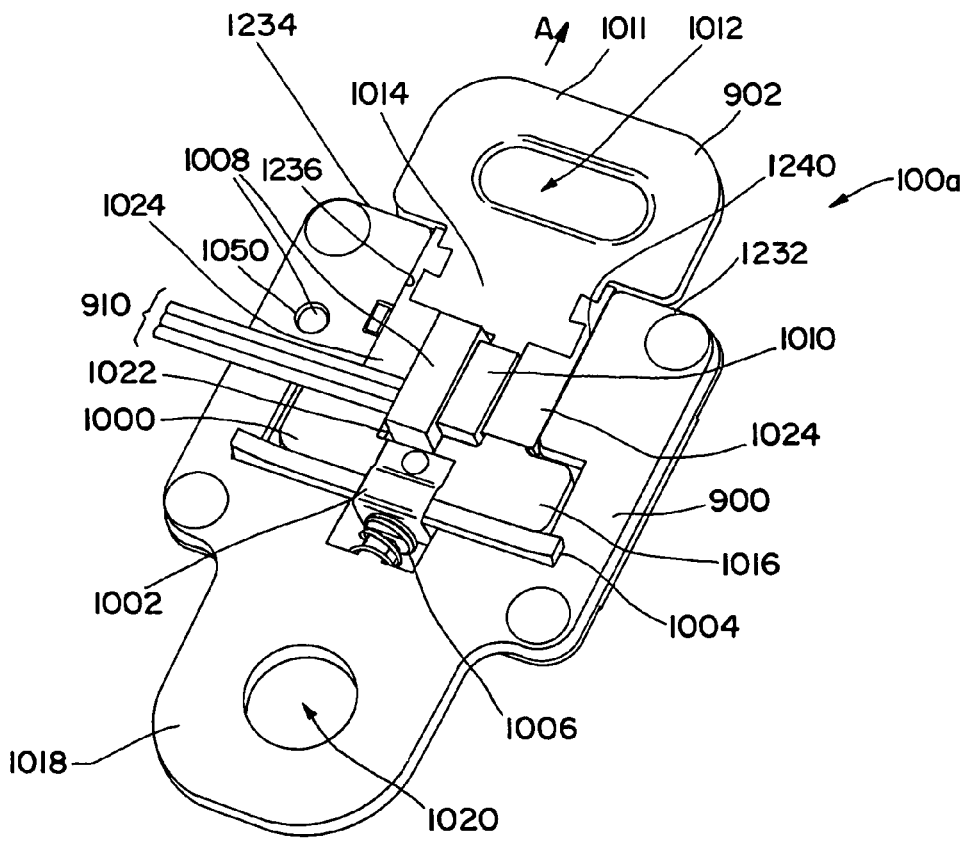
FIG. 10: is a rear perspective view of the sensor illustrated in FIG. 9 with a back cover removed.

The sensor is illustrated in FIGS. 10 and 11 with the front and rear covers removed to show internal components and the configurations of the main and travel member. As shown, the body of the main plate includes an opening 1000 for receiving the travel member. In this embodiment, the opening 1000 in the main plate has an open end so that the travel member extends at least partially out of the opening, i.e. the main plate does not completely enclose the travel member. The travel member includes an end portion 1011 extending out of the opening 1000 and having an opening 1012 therein through which the belt webbing 26 may be looped. A narrow middle portion 1014 of the travel member carries a magnet holder 1010, and includes an opening 1022 for receiving a PCB holder 1008. A travel member bearing 1024 is integrally formed with the magnet holder to reduce friction between the travel member and the main plate. A wider end portion 1016 is coupled to the main plate through a spring anchor 1002, first and second flat leaf springs 1004, and a compression spring 1006 disposed about a post on the main plate. The end 1018 of the main plate opposite to the end 1010 of the travel member includes an opening 1020 for coupling the sensor 100 to a fixed structure in the vehicle.

In general, tension on the seat belt 26 extending through the opening 1012 of the travel member 902 causes relative movement between travel member 902 and the main plate 900. The magnet holder 1010 is fixed to the travel member and includes one or more magnets. The PCB holder 1008 is disposed in the opening 1022 of the travel member, but is fixed to the main plate by a web of material 1100 extending behind the travel member and into an opening 1050 in the travel member, as shown in FIG. 11. Thus, relative movement between the travel member and the main plate is associated with relative movement between the magnet holder and the PCB holder.

Figure 13:
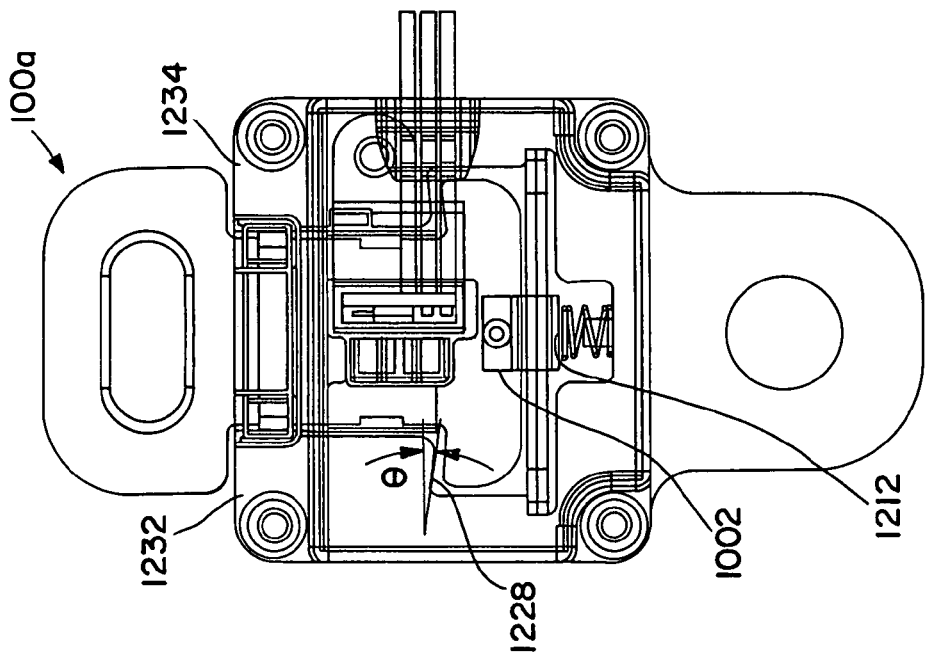
FIG. 13: is a front orthographic view of the sensor illustrated in FIG. 9.
Figure 12:
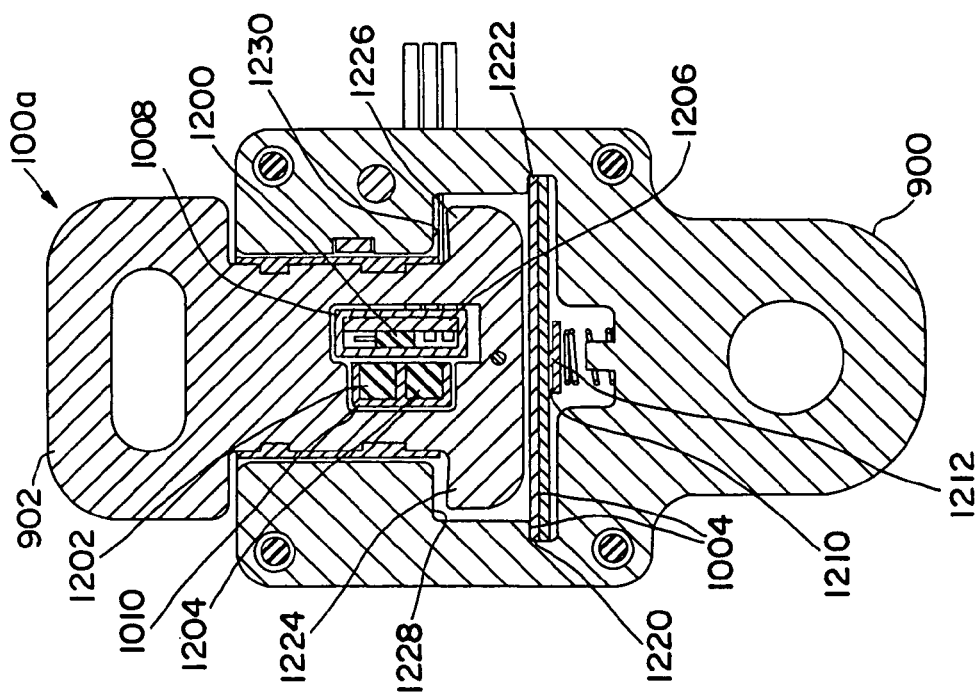
FIG. 12: is a front sectional view of the sensor illustrated in FIG. 9.

The PCB holder 1008 may include a Hall Effect device disposed adjacent at least one magnet in the magnet holder. FIGS. 12–13, for example, illustrate and exemplary orientation of a Hall device 1200 and magnets 1202, 1204 in the magnet holder 1010. In the illustrated embodiment, two magnets 1202, 1204 are provided in the magnet holder and the Hall device 1200 is disposed adjacent the magnets on a PCB board 1206 that carries electronics for providing power to the Hall device through the leads 910. The PCB holder 1008 may be insert molded to encapsulate the Hall, the PCB, and the electronics, and the magnet holder 1010 may be insert molded to encapsulate the magnets. Encapsulating the magnets and PCB provides robust environmental sealing. Again, a variety of materials, e.g. Nylon 6/12 or Nylon 6/6, may be used for encapsulating the magnets and PCB, etc. to form the magnet and PCB holders.

Movement of the travel member 902 relative to the main plate 900 resulting from tension on the seat belt is achieved against the bias of the flat springs. When the size of the sensor is of concern two flat springs 1004 may be provided, as shown in the illustrated embodiment. Use of two flat springs allows a lower profile, e.g. about 10 mm in thickness in the illustrated embodiment, as opposed to a single spring which would have to be wider to achieve the same spring constant as the two springs. As shown, the springs may be fixed to the travel member by the spring anchor 1002. As shown particularly in FIGS. 12 and 13, the inside, bottom surface 1210 of the spring anchor may include a centering projection 1212 extending therefrom to direct force from the travel member to the center of the bottom flat spring 1004.

In the illustrated exemplary, embodiment, the compression spring 1006 provides back bias to take up any tolerance between the flat springs and the shelves 1220, 1222 on the main plate engaged by the ends of the flat springs 1004. This prevents lost motion and ensures a zero-load rest position, as illustrated in FIGS. 9–13. When tension is applied to the travel member, the travel member may move, against the spring force of the flat springs, in the direction of arrow A in FIG. 10. In one embodiment, under a load of 30 lbs in the direction of arrow A, the travel member may move 0.040" from the rest position. A corresponding displacement occurs between the Hall device in the PCB holder and the magnets in the magnet holder.

Movement of the travel member relative to the main plate is limited by engagement of contact surfaces 1224, 1226 on the end of the travel member with associated shoulders 1228, 1230 on the main plate. In one embodiment, the shoulders 1228, 1230 may slope downwardly toward the center of the main plate at an angle θ as shown particularly in FIG. 13. This angled orientation for the shoulders 1228, 1230 of the main plate prevents outward deflection of the opposed arms 1232, 1234 of the main plate when the end contact surfaces engage the associated shoulders under excessive force.

To minimize hysteresis effects caused by friction between the travel member and the main plate, the travel member bearing 1024 may be a thin, insert molded component disposed on the sides of the travel member opposed to the interior side surfaces of the opposed arms 1232, 1234. In one embodiment, the magnet holder and travel member bearing can be molded around the travel member and magnets in a single step, whereby the magnet holder and travel member bearing are integrally formed. Those skilled in the art will recognize that the travel member bearing may be molded from a variety of low-friction materials. In one embodiment, for example, the travel member may be insert molded from acetyl.

Grease or other lubricant may also be provided between the travel member surfaces 1024 and the interior side surfaces 1236, 1240 of the opposed arms 1232, 1234. In an embodiment including a travel member bearing grease may be provided between the travel member bearing on either side of the travel member and the interior side surfaces. Grease or a lubricant in this location further reduces friction between the travel member and the main plate, and can also prevent entry of dust or other contaminants between the travel member and main plate.

Figure 14:
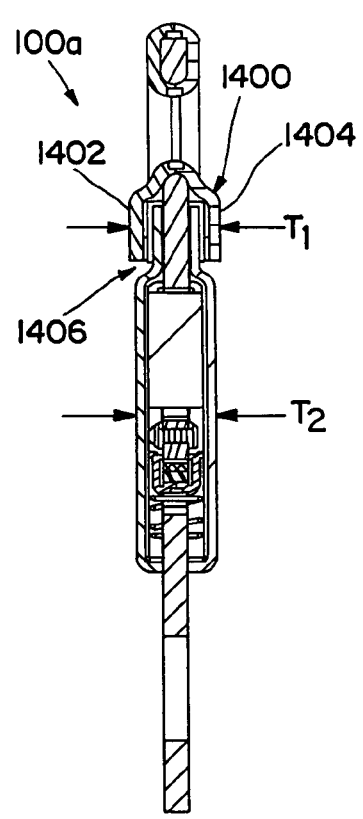
FIG. 14: is a sectional view of a sensor consistent with the invention including a shroud.
Figure 15:
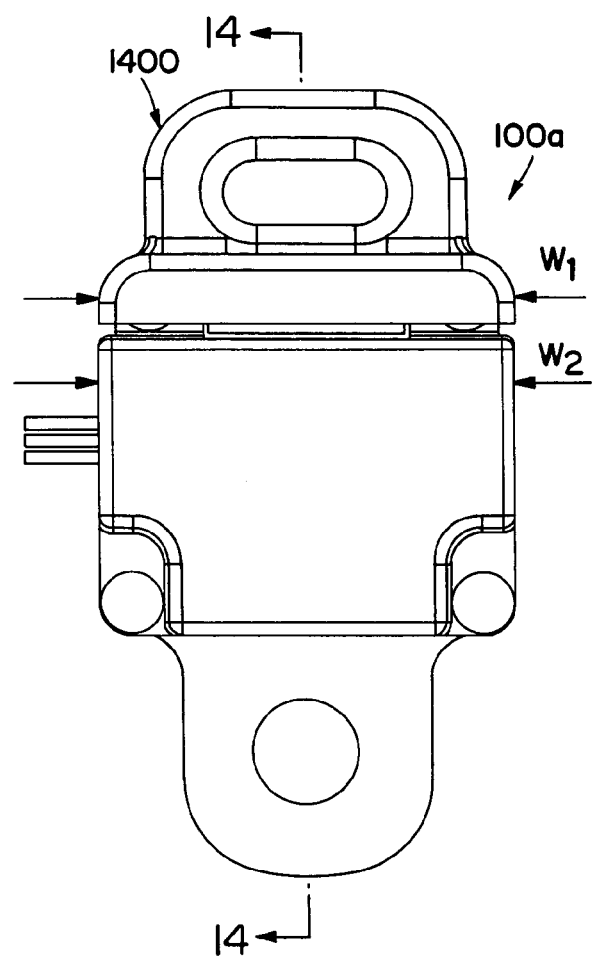
FIG. 15: is a rear view of the sensor and shroud illustrated in FIG. 14.

Turning now to FIGS. 14 and 15, a sensor consistent with the invention may also include a shroud 1400 for preventing entry of dust, fluids or other contaminants into the assembly through the spaces between the travel member end, the covers, and the main plate. In the illustrated exemplary embodiment, the shroud 1400 is provided as two separate pieces 1402, 1404 that snap together around opposite sides of the travel member, and around the surfaces defining the opening. As shown, the shroud may extend downward over the ends of the covers and main plate and over the rivets. To maintain a low profile, the ends of the covers may include a notch 1406 for receiving the thickness of the shroud so that the thickness T1 of the widest part of the shroud is the same as, or only slightly greater than the thickness T2 of the portion of the sensor covered by the remainder of the covers. Also, to provide minimal width the side surfaces of the main plate may be notched for receiving the thickness of the shroud so that the width W1 of the widest part of the shroud is the same as, or less than the width W2 of the widest portion of the senor assembly.

Figure 16:
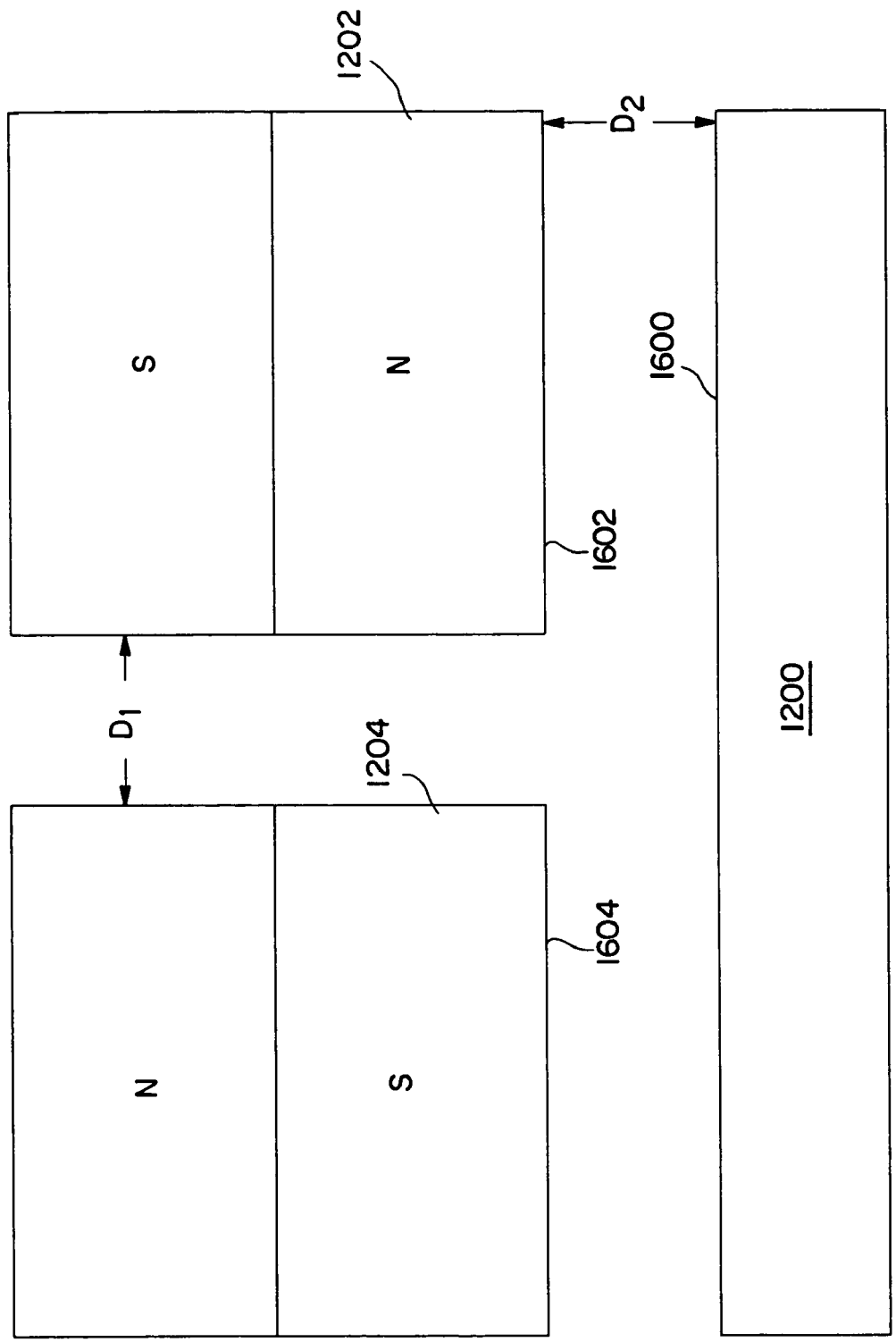
FIG. 16: diagrammatically illustrates another exemplary orientation of dual magnets and a hall device for use in a sensor consistent with the invention.

Turning now to FIG. 16, a sensor consistent with the invention may include two magnets 1202, 1204 disposed in the magnet holder in opposed facing relationship to the Hall Effect device 1200 disposed on the PCB in the PCB holder. Advantageously, one of the magnets 1204 may be positioned with a South pole facing the Hall device, and the other magnet 1202 may be positioned adjacent the first magnet with a North pole facing the Hall device, as shown in FIG. 15. In one embodiment, the magnets may be spaced by a distance D1 of 0.50" and the face 1500 of the Hall device may be disposed about 0.050" from the magnet faces 1502, 1504. This configuration provides a high gradient magnetic circuit that reduces sensitivity to magnetic fields generated outside of the sensor, e.g. in a speaker. For example, a gradient of 4000 Gauss may be applied to the Hall Effect device through the range of motion of the travel member.

Figure 17:
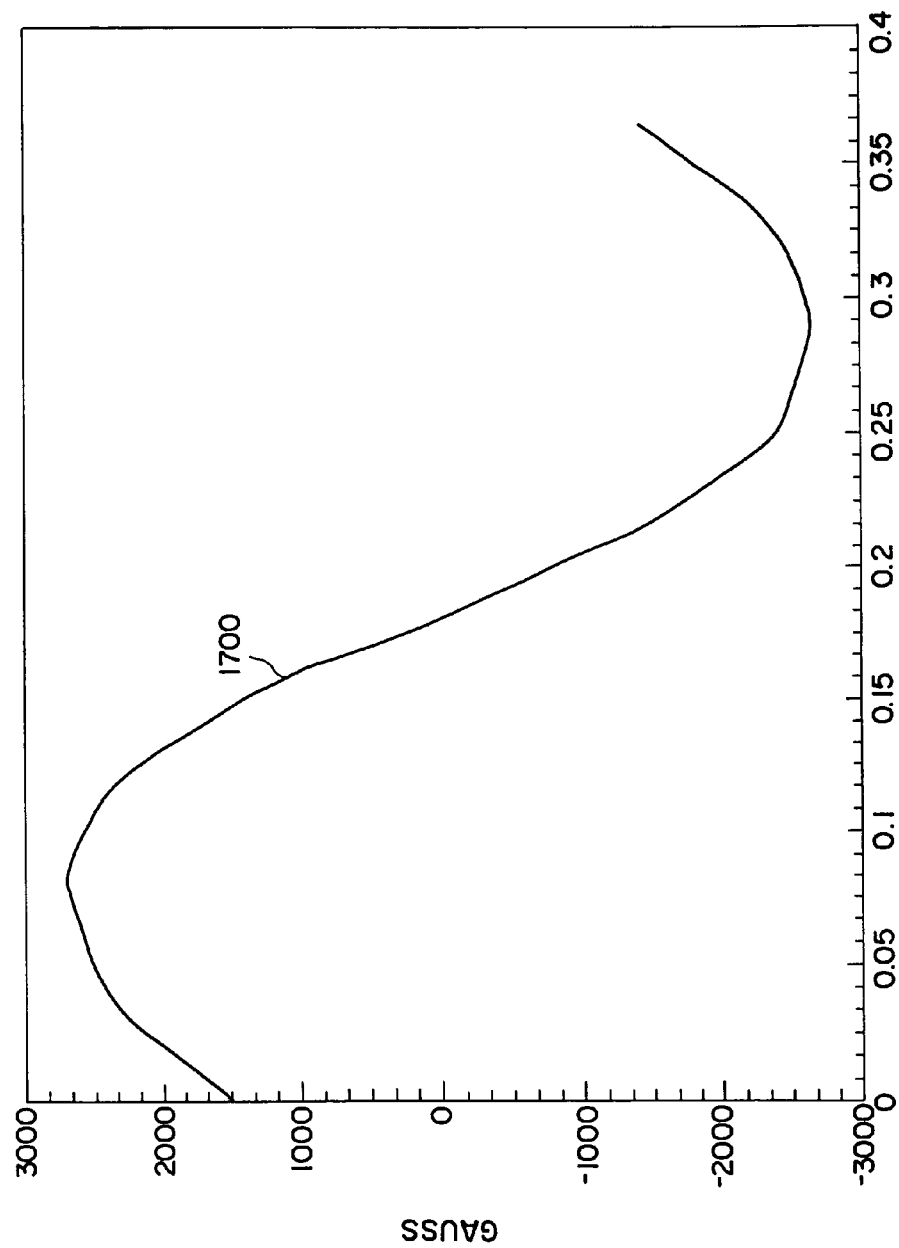
FIG. 17: is plot of magnetic flux vs. distance associated with the configuration illustrated in FIG. 16.

FIG. 17 is a plot of 1700 of magnetic flux vs. distance of travel of the magnets 1202, 1204 relative to the Hall Device 1200 for the embodiment illustrated in FIG. 16 versus. As shown, a gradient of about 2000 Gauss is associated with movement of about 0.050" of the magnets relative to the hall between 0.15" and 0.20" inches. This high gradient is due, at least in part, to the alternating pole arrangement of the magnets 1202, 1204.

Figure 18:
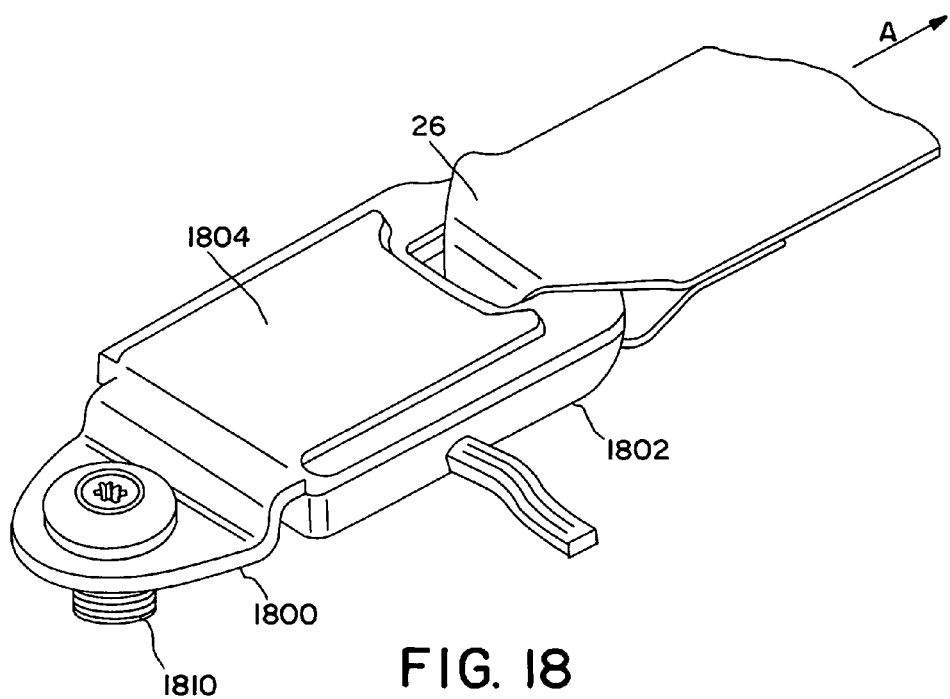
FIG. 18: is a perspective view of another exemplary seat belt tension sensor consistent with the invention.
Figure 19:
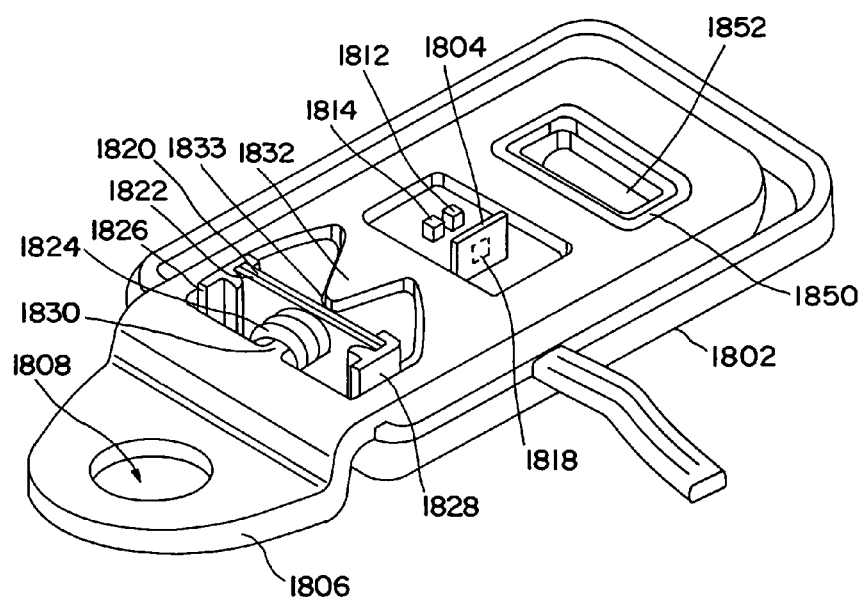
FIG. 19: is a perspective view of the sensor illustrated in FIG. 18 with a top housing portion removed.

Turning now to FIGS. 18 and 19, there is illustrated another embodiment 100b of a sensor assembly consistent with the invention. With reference to FIG. 18, the illustrated embodiment generally includes a main plate 1800 and upper 1802 and lower 1804 housing portions. The main plate 1800 may be disposed at least partially within the upper 1802 and lower 1804 housing portions. In the illustrated embodiment, an end 1806 of the main plate extends out of the housing formed by the upper 1802 and lower 1804 housing portions. The end 1806 of the main plate includes an opening 1808 for facilitating attachment of the main plate to a fixed vehicle structure, e.g. the "B" pillar or vehicle floor, through fastener 1810.

With reference also to FIG. 19, one or more magnets 1812, 1814 may be mounted to the lower housing portion 1802 and a PCB 1816 including a Hall device 1818 and associated electronics may be mounted to the main plate 1800. The magnets 1812, 1814 and Hall device 1818 may be oriented as shown in FIG. 16. The main plate 1800 may be coupled to the lower housing portion 1802 through first 1820 and second 1822 leaf springs and a compression spring 1824. The ends of the leaf springs may be captured in associated posts 1826, 1828 on the lower housing portion, and the compression spring may extend between a post 1830 on the main plate and the bottom leaf spring 1822. A spring actuator projection 1832 may be provided on the main plate 1800. The actuator projection may include an end surface 1833 for engaging the top leaf spring 1820. The compression spring 1824 may be provided as a bias to take up any play between the leaf springs 1820, 1822 and the spring actuator projection 1832 when the sensor is in an at-rest position, as shown in FIG. 19.

The main plate 1800 and upper 1804 and lower 1802 housing portions may include aligned openings 1850, 1852, respectively, through which the seat belt webbing 26 may be looped. The opening in the housing may be smaller than the opening in the main plate to allow relative movement between the housing portions and the main plate when tension is applied to the webbing in the direction of arrow A. Relative movement between the main plate and lower housing portion is associated with relative movement between the Hall device and magnets. In response to relative movement with tension applied in the direction of arrow A, the Hall device provides an output indicative of the tension applied to the webbing.

Also, relative movement between the housing and the main plate causes the spring actuator projection 1832 to depress the leaf springs 1820, 1822. The leaf springs may be selected to allow such relative movement upon application of a predetermined level of tension. Also, once a tension threshold, e.g. 30 lbs, is exceeded one or more of the housing portion 1802, 1804 may engage the main plate 1800, thereby transferring the tension load directly to the main plate 1800 to isolate the sensor from high loads.

There is thus provided a seat belt tension sensor assembly that reliably provides an output representative of the level of tension imparted to an automobile seat belt. The sensor includes a variety of advantageous features, as described above. In addition, the sensor design is modular, allowing modification of one or more components, e.g. the Hall device, magnets, springs, etc. to achieve desired performance. In addition, the design allows for flexibility in the desired sensor travel and the load vs. output requirements. Travel between 1 and 3 mm can easily be achieved by modification of the dimensions of the travel member and main plate, or by calibration of the magnetic circuit. The design also allows for flexibility in sensor mounting configurations.

The embodiments that have been described herein, however, are but some of the several which utilize this invention and are set forth here by way of illustration but not of limitation. Additionally, it will be appreciated that aspects of the various embodiments may be combined in other embodiments. It is obvious that many other embodiments, which will be readily apparent to those skilled in the art, may be made without departing materially from the spirit and scope of the invention as defined in the appended claims.

What is claimed is:

1. A seat belt tension sensor comprising:
   a main plate;
   a travel member disposed in a travel member opening defined in said main plate, said travel member having portions defining a belt loop opening for receiving seat belt webbing therethrough, and said travel member defining a generally u-shaped opening;
   at least one magnet coupled to said travel member and positioned at least partially in said generally u-shaped opening;
   a sensor coupled to said main plate and being positioned at least partially in said generally u-shaped opening and adjacent to said at least one magnet;
   at least one leaf spring disposed in a fixed position relative to said main plate; and
   at least one bias spring biasing said travel member against said at least one leaf spring, whereby upon application of tension to said seat belt webbing, said travel member is configured to move relative to said main plate against said at least one leaf spring.

2. A sensor according to claim 1, said at least one magnet, said sensor providing an output in response to flux imparted thereto by said at least one magnet, said output being indicative of a level of said tension.

3. A sensor according to claim 1, comprising first and second magnets coupled to said travel member and positioned at least partially in said generally u-shaped opening.

4. A sensor according to claim 1, wherein said travel member extends at least partially out from said travel member opening.

5. A sensor according to claim 1, wherein said travel member extends at least partially out from said travel member opening.

6. A sensor according to claim 1, said sensor comprising a shroud disposed over at least a portion of said travel member extending out from said travel member opening and also over at least a portion of said main plate.

7. A sensor according to claim 1, wherein said travel member is disposed entirely within said travel member opening.

8. A sensor according to claim 1, wherein said at least one bias spring comprises a compression spring disposed between said main plate and said travel member.

9. A sensor according to claim 1, said sensor comprising first and second ones of said leaf springs.

10. A sensor according to claim 1, said seat belt tension sensor further comprising a shroud disposed over at least a portion of said travel member extending out from said travel member opening and also over at least a portion of said main plate.

11. A sensor according to claim 1, wherein said travel member is disposed entirely within said travel member opening.

12. A seat belt tension sensor comprising:
    a main plate;
    a sensor coupled to said main plate; said sensor providing an output in response to flux imparted thereto;
    and a travel member disposed in a travel member opening defined in said main plate, said travel member having portions defining a belt loop opening for receiving seat belt webbing therethrough, said travel member comprising first and second magnets separated by a generally u-shaped opening, said sensor being disposed at least partially within said opening.

13. A seat belt tension sensor comprising:
    a main plate;
    a travel member disposed in a travel member opening defined in said main plate, said travel member having portions defining a belt loop opening for receiving seat belt webbing therethrough;
    at least one leaf spring disposed in a fixed position relative to said main plate;
    at least one bias spring biasing said travel member against said at least one leaf spring, whereby upon application of tension to said seat belt webbing, said travel member is configured to move relative to said main plate against said at least one leaf spring; and
    a shroud disposed over at least a portion of said travel member extending out from said travel member opening and also over at least a portion of said main plate.

* * * * *